(12) United States Patent
Xu et al.

(10) Patent No.: US 12,409,441 B2
(45) Date of Patent: Sep. 9, 2025

(54) METHOD OF PREPARING POLYMER-FILLED CHROMATOGRAPHY RESIN

(71) Applicant: Bio-Rad Laboratories, Inc., Hercules, CA (US)

(72) Inventors: James Wei Xu, Basking Ridge, NJ (US); Jiali Liao, San Ramon, CA (US); Christopher Belisle, Walnut Creek, CA (US); Fang Song, Wuxi (CN); Haihui Yuan, Nantong (CN); Juan You, Wuxi (CN); Wenli Cao, Wuxi (CN); Xiaozhong Bao, Wuxi (CN)

(73) Assignee: Bio-Rad Laboratories, Inc., Hercules, CA (US)

( * ) Notice: Subject to any disclaimer, the term of this patent is extended or adjusted under 35 U.S.C. 154(b) by 604 days.

(21) Appl. No.: 17/800,515

(22) PCT Filed: Feb. 19, 2020

(86) PCT No.: PCT/CN2020/075807
§ 371 (c)(1),
(2) Date: Aug. 17, 2022

(87) PCT Pub. No.: WO2021/163910
PCT Pub. Date: Aug. 26, 2021

(65) Prior Publication Data
US 2023/0087779 A1    Mar. 23, 2023

(51) Int. Cl.
*B01J 20/32* (2006.01)
*B01J 20/286* (2006.01)
*B01J 20/30* (2006.01)

(52) U.S. Cl.
CPC ......... *B01J 20/3204* (2013.01); *B01J 20/286* (2013.01); *B01J 20/3057* (2013.01); *B01J 2220/86* (2013.01)

(58) Field of Classification Search
CPC .... B01D 15/34; B01D 15/3847; B01J 13/043; B01J 20/286; B01J 20/3057; B01J 20/3204; B01J 20/321; B01J 20/3212; B01J 20/3274; B01J 41/20; B01J 2220/86; C01B 25/32; C08L 5/12; C08L 89/00
See application file for complete search history.

(56) References Cited

U.S. PATENT DOCUMENTS

| | | | |
|---|---|---|---|
| 4,551,245 A | 11/1985 | Ramsden et al. |
| 4,971,833 A | 11/1990 | Larsson et al. |
| 6,368,703 B1 | 4/2002 | Johnson |
| 6,423,666 B1 | 7/2002 | Liao et al. |
| 6,613,234 B2 | 9/2003 | Voute et al. |

(Continued)

FOREIGN PATENT DOCUMENTS

| | | |
|---|---|---|
| BR | PI0702934-9 A2 | 2/2009 |
| CN | 103923355 A | 7/2014 |

(Continued)

OTHER PUBLICATIONS

Extended European Search Report in EP Appln. 20919634.4 mailed Sep. 22, 2023; 14 pages.

(Continued)

*Primary Examiner* — Brian A McCaig
(74) *Attorney, Agent, or Firm* — Kilpatrick Townsend and Stockton LLP

(57) ABSTRACT

Methods of preparing polymer-filled chromatography resin and their uses are provided.

21 Claims, 1 Drawing Sheet

(56) References Cited

U.S. PATENT DOCUMENTS

| | | |
|---|---|---|
| 6,972,090 B2 | 12/2005 | Boschetti et al. |
| 7,678,269 B2 | 3/2010 | Cheng et al. |
| 8,093,373 B2 | 1/2012 | Alstine et al. |
| 8,182,831 B2 | 5/2012 | Lin et al. |
| 8,574,437 B2 | 11/2013 | Bergstrom et al. |
| 8,814,936 B2 | 8/2014 | Draenert |
| 9,155,980 B2 | 10/2015 | Glad et al. |
| 9,259,729 B2 | 2/2016 | Bergstrom et al. |
| 9,278,297 B2 | 3/2016 | Bergstrom et al. |
| 9,382,473 B2 | 7/2016 | Chiu |
| 9,383,299 B2 | 7/2016 | Kunkel et al. |
| 10,814,305 B2 | 10/2020 | Liao et al. |
| 10,934,366 B2 | 3/2021 | Liao et al. |
| 2002/0104801 A1 | 8/2002 | Voute et al. |
| 2003/0125529 A1 | 7/2003 | Boschetti et al. |
| 2003/0166869 A1 | 9/2003 | Vedantham |
| 2006/0246524 A1 | 11/2006 | Bauer |
| 2007/0072303 A1 | 3/2007 | Arpaia |
| 2011/0045574 A1 | 2/2011 | Bergstrom et al. |
| 2012/0141497 A1 | 6/2012 | Gallo |
| 2013/0034854 A1 | 2/2013 | Ashworth-Sharpe |
| 2015/0377869 A1 | 12/2015 | Berkelman |
| 2018/0085735 A1 | 3/2018 | Liao et al. |
| 2021/0179736 A1 | 6/2021 | Liao et al. |

FOREIGN PATENT DOCUMENTS

| | | |
|---|---|---|
| CN | 103923355 B | 3/2016 |
| CN | 107042093 A | 8/2017 |
| CN | 109803736 A | 5/2019 |
| EP | 0337123 A1 | 10/1989 |
| EP | 1131383 B1 | 10/2003 |
| EP | 1071500 B1 | 3/2005 |
| GB | 2324601 A | 10/1998 |
| JP | 6316046 A | 1/1988 |
| JP | 2002-510541 | 4/2002 |
| JP | 2004-099433 A | 4/2004 |
| JP | 2010-132779 A | 6/2010 |
| WO | 0012618 A1 | 3/2000 |
| WO | 2007/008250 A2 | 1/2007 |
| WO | 2010/051360 A1 | 5/2010 |
| WO | 2013/096831 A1 | 6/2013 |
| WO | 2015/137860 A1 | 9/2015 |
| WO | 2017/174422 A1 | 10/2017 |
| WO | 2018/181925 A1 | 10/2018 |
| WO | 2019/173731 A1 | 9/2019 |

OTHER PUBLICATIONS

International Search Report and Written Opinion in PCT/CN2020/075807 mailed Oct. 26, 2020; 9 pages.

Basargan, T. et al.; "Spray-dried mesoporous hydroxyapatite-chitosan biocomposites"; *Polymer-Plastics Technology and Engineering*; Sep. 23, 2015; vol. 54, pp. 1172-1183.

Wang, A.J. et al.; "Effect of process parameters on the performance of spray dried hydroxyapatite microspheres"; *Powder Technology*; Apr. 4, 2009; vol. 191, No. 1-2; pp. 1-6.

"Capto Core 700"; GE Healthcare Life Sciences; Data file: 28-9983-07 AA, Multimodal chromatography; Mar. 2012; pp. 1-4.

"BioSepra HA Ultrogel"; Product Insert; Insert No. 292200; PALL Life Sciences; Mar. 2007; 2 pages.

Pall Life Sciences, "BioSepra HA Ultrogel: Product Note", [available online at https://lshop.pall.com/INTERSHOP/web/WFS/PALL-PALLUS-Site/en_US/-/USDNiewProductAttachment-OpenFile?LocaleId=&DirectoryPath=pdfs%2FBiopharmaceuticals&FileName=HA_Uitrogei_Pall, Aug. 29, 2006.

Kolanthai, et al., "Synthesis of nanosized hydroxyapatite/agarose powders for bone filler and drug delivery application", Materials Today Communications, vol. 8, May 16, 2016, pp. 31-40.

PCT/US2017/053217, "International Search Report and Written Opinion", Dec. 11, 2017, 9 pages.

"BioSepra HA Ultrogel: Process Proteomics Product Note" (Oct. 2002), BioSepra S.A., Ciphergen BioSepra Process Division, pp. 1-4.

"Purification of influenza A/H1N1 using Capto Core 700," Data file: 29-0003-34 AA, GE Healthcare Bio-Sciences AB, (Mar. 2012), pp. 1-8.

Zhang, Yue et al., "Light-induced Crosslinkable Semiconducting Polymer Dots," NIH Public Access, Chemical Science, (Mar. 2015), vol. 6(3), pp. 2102-2109.

Bio-Rad Laboratories, Inc.; "CHT Ceramic Hydroxyapatite"; Bulletin 5667, Rev. B; Jul. 2013; 4 pages.

Machine Translation of Wang CN 103923355.

Extended European Search Report in EP Appln. 17857257.4 mailed Apr. 2, 2020; 13 pages.

Fisher Scientific; "Centrifugation Theory"; Accessed Jun. 16, 2020; 7 pages.

"Capto Core 400 Capto-Core 700"; GE Healthcare Life Sciences; Product Info Sheet; 2012-2018; 8 pages.

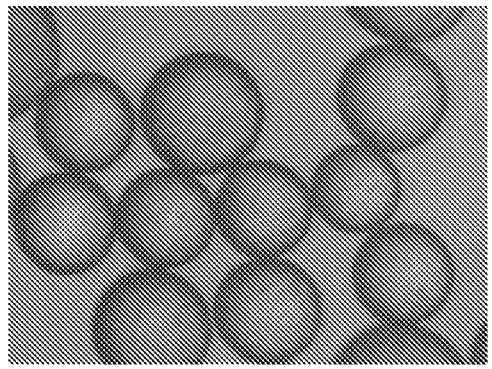
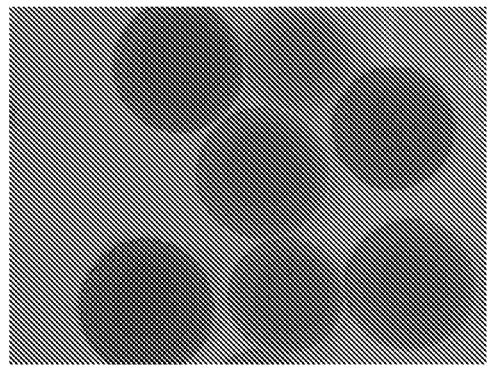
FIG. 1A  FIG. 1B
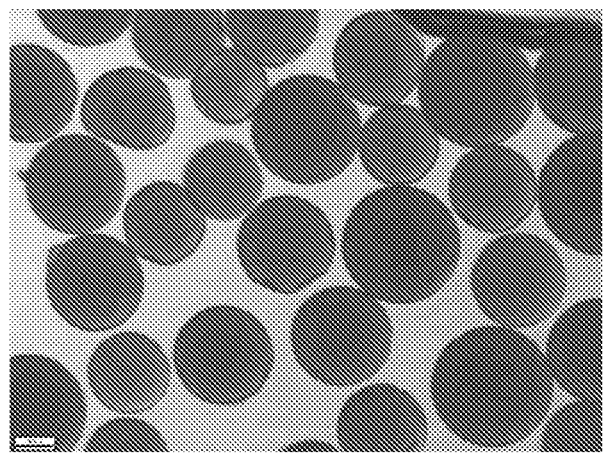
FIG. 2

METHOD OF PREPARING POLYMER-FILLED CHROMATOGRAPHY RESIN

CROSS-REFERENCES TO RELATED APPLICATIONS

The present application is a US National Phase Application Under Section 371 of International Application PCT/CN2020/075807, filed Feb. 19, 2020, which is incorporated herein by reference in its entirety.

BACKGROUND OF THE INVENTION

Purification of viruses, proteins conjugated to large particles, and other large biomolecules from smaller impurities currently involves using a variety of separation methods including, but not limited to, size exclusion chromatography (SEC), ion exchange chromatography (IEX), hydrophobic interaction chromatography (HIC) and/or centrifugation. SEC requires large columns packed with expensive size exclusion resin, low flow rates and limited sample loads. IEX and HIC have limited selectivity. Centrifugation can only be applied to large biomolecules that are relatively dense compared to the medium in which the biomolecules are suspended.

BRIEF SUMMARY OF THE INVENTION

A method of preparing a chromatography resin comprising an insoluble porous polymer is provided. In some embodiments, the method comprises adding a chromatography resin to a solution comprising a melted polymer while stirring to allow the melted polymer to absorb or otherwise enter the pores of the chromatography resin. The solution is then atomized and insoluble porous polymer-filled chromatography resin beads are collected in a water bath. Excess polymer is then removed from the insoluble porous polymer-filled chromatography resin beads by, for example, passing the insoluble porous polymer-filled chromatography resin beads through screens having openings from about 50 μm to about 200 μm and/or washing the insoluble porous polymer-filled chromatography resin beads. In some embodiments, a temperature of the melted polymer solution is about 100° C. In some embodiments, the polymer is agarose and the concentration of the agarose ranges from about 0.5% to about 8%. In certain embodiments, the chromatography resin is a macroporous resin. In some embodiments, the chromatography resin is a hydroxyapatite microsphere. In some embodiments, the macroporous resin comprises acrylamide, methacrylate, polystyrene, or silica. In certain embodiments, the macroporous resin comprises a copolymer of 3-allyloxy-1,2-propanediol and vinyl pyrrolidinone crosslinked with N,N'-methylenebisacrylamide. In some embodiments, the macroporous resin comprises glycidyl methacrylate and diethylene glycol dimethacrylate. In certain embodiments, atomizing the solution comprises surrounding the solution emerging from a nozzle with a stream of air (e.g., at about 20° C. to about 90° C. with a velocity of about 15 L/minute to about 25 L/minute). In some embodiments, a temperature of the water bath is about 4° C. to about 40° C.

Also provided are methods of performing chromatography using the polymer-filled chromatography resin. In some embodiments, the method comprises contacting a sample comprising a target molecule to an insoluble porous polymer-filled chromatography resin under conditions such that the target is not captured by the chromatography resin, and collecting the target molecule from the insoluble porous polymer-filled chromatography resin. In some embodiments, the sample comprises a contaminant that is captured by the chromatography resin.

In some embodiments, the target molecule is a protein-nanoparticle conjugate and the contaminant is free (unconjugated) protein. In some embodiments, the sample comprises the protein-nanoparticle conjugate, free protein, and a buffer. In certain embodiments, the target is a virus. In some embodiments, the sample further comprises a surfactant (e.g., polyalkylene glycol or Pluronic F-68). In certain embodiments, the collecting step comprises collecting one or more fractions enriched for the target molecule from the insoluble porous polymer-filled chromatography resin. In some embodiments, the collecting step comprises applying centrifugal force or a vacuum to the insoluble porous polymer-filled chromatography resin and collecting one or more fractions enriched for the target molecule from the insoluble porous polymer-filled chromatography resin. In some embodiments, the protein is an antibody. In some embodiments, the protein is an IgG antibody. In certain embodiments, the protein-nanoparticle conjugate is a protein-polymer dot conjugate. In some embodiments, the sample further comprises free nanoparticles and the insoluble porous polymer-filled chromatography resin separates the free nanoparticles from the conjugate.

BRIEF DESCRIPTION OF THE DRAWINGS

FIG. 1A shows an image of agarose-filled hydroxyapatite microspheres.

FIG. 1B shows an image of dyed agarose-hydroxyapatite microspheres after hydroxyapatite is dissolved using HAc-NaAc buffer pH=3.5.

FIG. 2 shows an image of agarose-filled UNOspheres.

DETAILED DESCRIPTION OF THE INVENTION

The inventors have discovered a novel method of preparing an insoluble porous polymer-filled chromatography resin having multimodal properties, i.e., a size exclusion mode and a capture mode. The inventors have also discovered that insoluble porous polymers can be introduced into resins without significantly affecting the resin selectivity or binding capacity. The scalable method does not use an organic solvent and therefore is environmentally friendly. The method produces separate polymer-filled chromatography resin beads without clusters of the beads within the polymer.

Definitions

The term "hydroxyapatite" refers to an insoluble hydroxylated mineral of calcium phosphate with the structural formula $Ca_{10}(PO_4)_6(OH)_2$. Hydroxyapatite chromatography resin is considered a multimodal resin in that it has multiple modes of interaction with biomolecules. Its dominant modes of interaction are phosphoryl cation exchange and calcium metal affinity. Hydroxapatite is commercially available in a variety of forms including, but not limited to, hydroxyapatite microspheres which is a chemically pure form of hydroxyapatite that has been sintered at high temperature to modify it from a crystalline to a ceramic form. Hydroxyapatite microspheres are spherical in shape, with particle diameters ranging from about 10 microns to about 100 microns, and are typically available at nominal diameters of 20 microns, 40 microns, and 80 microns. Hydroxyapatite microspheres (or HAM) is macroporous, and is available in three types: Type I, with a medium porosity and a relatively high binding capacity, and Type II, with a larger porosity and a lower binding capacity, and Type XT with a medium porosity, a relatively high binding capacity, and excellent pressure-flow properties. All of the apatite-based resins in this paragraph are available from Bio-Rad Laboratories, Inc. (Hercules, California, USA).

The term "antibody" refers to an immunoglobulin or fragmentary form thereof. The term includes, but is not limited to, polyclonal or monoclonal antibodies of the classes IgA, IgD, IgE, IgG, and IgM, derived from human or other mammalian cell lines, including natural or genetically modified forms such as humanized, human, single-chain, chimeric, synthetic, recombinant, hybrid, mutated, grafted, and in vitro generated antibodies. "Antibody" encompasses composite forms including, but not limited to, fusion proteins containing an immunoglobulin moiety. "Antibody" also includes antibody fragments such as Fab, F(ab')2, Fv, scFv, Fd, dAb, Fc and other compositions, whether or not they retain antigen-binding function.

The term "protein" is used to denote an amino acid polymer or a set of two or more interacting or bound amino acid polymers. The term applies to amino acid polymers in which one or more amino acid residue is an artificial chemical mimetic of a corresponding naturally occurring amino acid, as well as to naturally occurring amino acid polymers, those containing modified residues, and non-naturally occurring amino acid polymers.

The term "sample" refers to any composition containing a target molecule that is desired to be purified. In some embodiments, the target molecule to be purified is a protein-nanoparticle conjugate (e.g., an antibody-nanoparticle conjugate) or a virus.

The term "contaminant" refers to any impurity that is to be removed from a sample. In some embodiments, the sample is a conjugation reaction mixture of antibody-nanoparticle conjugate and unreacted components and the contaminant is unconjugated (unreacted or free) antibody (and optionally unconjugated nanoparticles).

As used herein, the terms "a", "an" and "the" are intended to mean "one or more." As used herein, the term "about" refers to the recited number and any value within 10% of the recited number. Thus, "about 5" refers to any value between 4.5 and 5.5, including 4.5 and 5.5.

Method of Preparing Polymer-Filled Chromatography Resin

In an embodiment, a method of preparing a polymer-filled chromatography resin comprises adding a chromatography resin to a solution comprising melted polymer while stirring to allow the melted polymer to absorb or otherwise enter the pores of the chromatography resin. In embodiments, the polymer is dissolved in water that is heated to a temperature above the polymer melting point. In an embodiment, the polymer is insoluble such that the aqueous conditions of chromatography do not remove the polymer from the chromatography resin during chromatography. In embodiments, the polymer is sufficiently porous so that filling the chromatography resin does not prevent macromolecules (e.g., proteins, nucleic acids, etc.) from interacting with sites within the chromatography resin, thereby substantially maintaining the selectivity and binding capacity of the chromatography resin. The chromatography resin is porous and allows target molecules to interact with the chromatography resin, at least in part, via pores in the resin. Thus, the polymer should not significantly interfere with this interaction.

A variety of polymers can be used to fill the chromatography resin. In some embodiments, the polymer is agarose. Agarose (e.g., 0.5-8%) can be introduced into the chromatography resin by heating the agarose to melt the agarose and mixing the melted agarose solution with chromatography resin. In some embodiments, the agarose solution is heated to about 100° C. In certain embodiments, the agarose solution is heated from about 60° C. to about 100° C.

The melted polymer/chromatography resin solution is then atomized by flowing the solution through a nozzle and surrounding the solution emerging from the nozzle with a stream of air to form viscous polymeric droplets and chromatography resin beads with polymer coating the external surface and within the pores of the beads. In some embodiments, the nozzle is a binary nozzle, for example wherein combined heated air and suspension flow to the nozzle opening. In some embodiments, a temperature of the stream of air is about 20° C. to about 90° C. In certain embodiments, a velocity of the stream of air is about 15 L/minute to about 25 L/minute (e.g., about 20 L/minute). To prevent the recombination of the resin beads and the polymer droplets, the resin beads and polymer droplets are collected in a water bath immediately after atomization. The polymer droplets and the polymer incorporated within the pores of and on the surface of the resin solidify. The polymer-filled resin beads are collected at the bottom of the water bath while the excess polymer (i.e., solid polymer droplets) remain suspended in the water. The excess polymer is removed from the insoluble porous polymer-filled chromatography resin beads by, for example, passing the beads suspended in water through screens having openings ranging from about 50 μm to about 200 μm. In some embodiments, 120 μm and 65 μm screens are used to remove excess polymer. As an option, the excess polymer is removed by washing the polymer-filled resin beads. In some embodiments, the excess polymer is removed by decanting the suspension. In some embodiments, a spray nozzle diameter is 1-3 mm in diameter, e.g., 2 mm in diameter. In some embodiments, a temperature of the water bath is between about 4° C. and 40° C.

In some embodiments, the agarose in the heated agarose solution is at a sufficient concentration (e.g., more than about 0.5%, 1%, 2%, 3%, or 4% agarose) to fill the pores of the chromatography resin and to coat the outside of the chromatography resin. The agarose solution inside the beads forms an insoluble gel at a temperature less than about 40° C.

In some embodiments, the agarose will not be cross-linked. For instance, as described in the examples, the agarose can be introduced into the chromatography resin in uncross-linked form. However, in some embodiments, a cross-linking agent (e.g., a chemical cross-linking agent including, but not limited to, divinylsulfone, epichlorhydrin, butanediol diglycidylether, 1,3 dichloropropanol, 2,3 dibromopropanol) is introduced after the agarose has filled the chromatography resin. Thus, in some embodiments, the agarose within the chromatography resin will be cross-linked.

Generally, the agarose will not be functionalized. Thus, in some embodiments, the agarose will not be modified to interact with components of the sample during chromatography, thereby providing substantially the same selectivity as the chromatography resin without the polymer.

A variety of macroporous resins suitable for chromatography can be used in the methods described herein. In some embodiments, the resin is a ceramic hydroxyapatite. In some embodiments, Type I or Type II ceramic hydroxyapatite can be used (i.e., either porosity can be used). In some embodiments, the resin is functionalized with, for example, an ion exchange functional group, a hydrophobic-interaction functional group, a mixed-mode functional group, or an affinity ligand. The optimal porosity for any particular protein separation or purification will vary with the proteins or the composition of the source mixture. In certain embodiments, the chromatography resin is a macroporous resin comprisesacrylamide, methacrylate, polystyrene, or silica. In an embodiment, the macroporous resin comprises a copolymer of 3-allyloxy-1,2-propanediol and vinyl pyrrolidinone crosslinked with N,N'-methylenebisacrylamide. In another embodiment, the macroporous resin comprises glycidyl methacrylate and diethylene glycol dimethacrylate. Examples of such macroporous resins include, but are not limited to, UNOsphere Q, UNOsphere S, UNOsphere Rapid S, Macro-Prep High Q, Macro-Prep DEAE, Macro-Prep 25 Q, Macro-Prep CM, Macro-Prep 25 S, Nuvia S, and Nuvia Q (all from Bio-Rad). Other examples of macroporous resins include, but are not limited to, Toyopearl SP, CM Q, DEAE, DGigaCap S, CM, Q from Tosoh Bioscience, Poros HS, XS, HQ, XQ from Thermo Fisher Scientific. Eshmuno S, Q, CPX, CPS, HCX from Millipore, and Sepharose Q, Sepharose S, Capto Q, Capto S, Capto MMC, Capto Adhere from GE healthcare.

The polymer-filled resin can be used as a chromatographic solid phase in the form of a packed bed, and can constitute either the entire packed bed or a major portion, such as 50% or more by volume, of the packed bed. The packed bed can be retained in a vessel of any configuration, and both the purification performed in the resin and the cleaning and regeneration can be performed either as a batch process, a continuous process, or a hybrid batch/continuous process. In an embodiment, the vessel is a column having an appropriate length relative to width and a suitable process includes a continuous process such as a continuous flow through a column.

The chromatography resin (e.g., chromatography beads) can have a size exclusion mode and a capture mode. The size exclusion mode separates molecules, complexes or particles based on their size or molecular weight. The beads have pores sized such that molecules, complexes or particles above a size threshold are excluded from entering the pores and are collected in a void volume, an excluded volume or in a chromatography column flow through. Smaller proteins and other molecules can enter the pores of the beads and are captured by the beads. As used herein, a molecular weight cutoff size of the beads refers to the approximate size of the protein or molecule that is able to enter the pores. As the percent of agarose filling the pores of the hydroxyapatite microspheres increases, the pores become smaller, resulting in a lower molecular weight cutoff size. Thus, the molecular weight cutoff for 4% agarose-filled beads will be less than the molecular weight cutoff for 0.5% agarose-filled beads.

Method of Using Polymer-Filled Chromatography Resin

The polymer-filled chromatography resins as described herein can be used in a chromatography method. In an embodiment, the method comprises contacting a sample comprising a target molecule to a polymer-filled chromatography resin (e.g., a plurality of agarose-filled hydroxyapatite microspheres) under conditions such that the target is not captured by the beads. In an embodiment, the sample comprises a contaminant that is captured by the polymer-filled chromatography resin.

Before the sample is applied to the polymer-filled chromatography resin, the resin is often equilibrated in the buffer or salt used to load the sample. Generally, the same conditions and reagents are used as in standard chromatography. For example, for ceramic hydroxyapatite-based chromatography, any of a variety of buffers or salts can be used, including those with cations such as sodium, potassium, ammonium, magnesium, and calcium, and anions such as chloride, fluoride, acetate, phosphate, and citrate. The pH of the equilibration solution is typically about 6.0 or higher, in many cases the pH is within the range of about 6.5 to about 8.6 or a range of about 6.5 to about 7.8. In some embodiments, equilibration may take place in a solution comprising a Tris or a sodium phosphate buffer. The sodium phosphate buffer may be, for example, present at a concentration from about 0.5 mM to about 50 mM, or from about 10 mM to about 35 mM.

As noted above, the chromatographic step described herein can be performed in a conventional purification configuration including, but not limited to, packed columns and fluidized or expanded-bed columns and by any conventional chromatography method including batch modes for loading, washing, and elution, as well as continuous or flow-through modes. In some embodiments, the medium is packed in a column having a diameter ranging from less than 0.5 centimeter to more than a meter and a column height ranging from less than one centimeter to more than 30 centimeters. In an embodiment, the resin is provided in a spin column. The sample is applied to the top of the spin column and centrifugation or vacuum forces the sample through the column. In some cases, the resin is provided in a chromatography column, the sample is applied to the top of the column and gravity forces the sample through the column. The column can be run with or without pressure and from top to bottom or bottom to top, and the direction of the flow of fluid in the column can be reversed during the process. In some cases, it can be advantageous to reverse the flow of liquid while maintaining the packed configuration of the packed bed.

The method described herein can be used for purifying many types of target molecules, including viruses, naturally occurring proteins, and recombinant proteins. In some embodiments, the target molecule is conjugated or attached to a reporter, e.g., a nanoparticle. In some embodiments, the target molecule is an antibody (e.g., IgG) conjugated to a nanoparticle. Nanoparticles are particles sized on a nanoscale, e.g., from about 1 nm to about 1000 nm. In some embodiments, the particles are between 1-300 nm, 5-500 nm, or 10-50 nm. Many nanoparticles are roughly spherical in shape, which results in a dimension being the radius or diameter of the spherical particle. The hydrodynamic radius or diameter can also be used to define the nanoparticle size.

In some embodiments, the nanoparticle is a fluorescent semiconducting polymer dot (pdot). Examples of such pdots are described in, e.g., Wu, C., et al., *Chem. Mater.* 21:3816-3822 (2009); Rahim, N. A. A., et al., *Adv. Mater.* 21:3492-3496 (2009), Rong et al., *ACS Nano* 7(1):376-84 (2013); patent publications US 2013/0266957; WO 2012/054525; and US 2012/0282632. Chromophoric pdots can be generated by collapsing polymers into a stable sub-micron sized particle. The pdot nanoparticles provided herein may be formed by any method known in the art for collapsing polymers, including without limitation, methods relying on precipitation, methods relying on the formation of emulsions (e.g. mini or micro emulsion), and methods relying on condensation. The pdot nanoparticle size is dependent on the molecular weight of the polymer used to generate the pdots (see, for example, Zhang, Y., et al., *Chem Sci.* 6(3):2102-2109 (2015) and U.S. Pat. No. 9,382,473). In some embodiments, the molecular weight of each pdot ranges from about 500,000 Daltons to about 15,000,000 Daltons, or from about 1,800,000 Daltons to about 7,000,000 Daltons.

Other exemplary nanoparticles that can be used in methods described herein include, but are not limited to, magnetic nanoparticles, quantum dots, and gold nanoparticles. Magnetic nanoparticles are a class of nanoparticle that can be manipulated using magnetic field gradients. Magnetic nanoparticles are formed from magnetic or paramagnetic elements including, but not limited to, iron, nickel and cobalt and their chemical compounds. Quantum dots are nanoparticles formed from inorganic semiconducting material. Gold nanoparticles (e.g., colloidal gold) have optical properties that are conducive to biomedical applications and are described in, for example, Huang, X., et al., *Journal of Advanced Research* 1(1):13-28 (2010).

Nanoparticles can be functionalized as desired to link the nanoparticle to a protein. Exemplary functionalization of nanoparticles is described in the aforementioned US Patent Publication No. 2012/0282632. As an example, a nanoparticle can be functionalized to present one or more carboxylic acid moieties, which in turn can be used to link one or more linker to a protein. The conjugate components (e.g., protein and nanoparticle) can be linked covalently or non-covalently. An example of a non-covalent linkage is a biotin-streptavidin affinity linkage in which one member of the conjugate is biotinylated and the other member of the conjugate is linked to streptavidin. Other examples of linkage options include, but are not limited to, direct coupling of nanoparticles to protein amines; modification of nanoparticles with maleimide and subsequent linkage to a protein having an exposed thiol group (generated, for example, by treating the protein with mercaptoethylamine or 2-iminothiolane (Traut's reagent)); modification of nanoparticles with hydrazine and linkage to a protein with oxidized glycan (aldehyde); or use of click chemistry (e.g., modification of nanoparticles with strained alkyne and linkage to an protein modified with azide).

Any type of conjugation methods can be used for conjugating a protein to a nanoparticle. Generally, to generate a desired yield of conjugate, an excess of protein is provided in the conjugation reaction. This can result in a significant amount of free (unconjugated) protein following the conjugation reaction. In some embodiments, there is also an amount of free unconjugated nanoparticles in the reaction mixture. The methods described herein are useful for purifying the conjugates from the free unconjugated members of the conjugation reaction. In some embodiments, a reagent is applied that will react with remaining reactive groups and prevent further reaction. As an example, conjugation between a maleimide-functionalized nanoparticle and a thiolated or reduced protein will be stopped or quenched with an alkylating reagent including, but not limited to, N-ethylmaleimide. The reaction between an NHS-appended nanoparticle and a protein will be stopped or quenched with an amine including, but not limited to, ethanolamine.

Once a conjugation has been performed, the resulting conjugation mixture (e.g., nanoparticle/protein conjugate, unreacted free protein and optionally free nanoparticle) is adjusted to establish an appropriate pH, conductivity, and/or concentration of salt. Adjustments can be made to the conjugation mixture (i.e., the sample to be purified) by, for example, exchanging a conjugation buffer with a chromatography resin equilibration buffer. Exemplary buffering compounds include, but are not limited to, phosphate, HEPES, IVIES, and Tris. In some embodiments, the equilibration buffer comprises HEPES in an amount ranging from about 10 mM to about 30 mM (e.g., 10 mM, 20 mM or 30 mM). In some embodiments, the equilibration buffer comprises phosphate ($PO_4^{3-}$) in an amount ranging from about 5 mM to about 50 mM (e.g., 5 mM, 10 mM, 25 mM). In certain embodiments, the equilibration buffer pH ranges from about 5 to about 8 (e.g., about 6, about 7, or about 8). In some embodiments, the equilibration buffer comprises at least 10 to 100 mM $Na^+$ or $K^+$ (e.g., between 10-150 mM, 20-200 mM, or 100-300 mM). In certain embodiments, the equilibration buffer is 20 mM HEPES-KOH pH 7.3. In some embodiments, the equilibration buffer is phosphate buffered saline (PBS=10 mM sodium phosphate, 150 mM sodium chloride pH 7.8).

One or more surfactants can also be included in the mixture. A sufficient amount of the surfactant can be included to stabilize the conjugates to prevent aggregation and precipitation of the conjugates in the mixture, especially upon introduction of a high ionic strength buffer, which might otherwise result in aggregation or precipitation of the conjugates. In some embodiments, the surfactant is a non-ionic polyalkylene glycol surfactant such as polyethylene glycol. In some embodiments, the surfactant is a polyoxypropylene-containing surfactant such as a poloxamer surfactant. Poloxamer surfactants are characterized by a central hydrophobic chain of polyoxypropylene (poly(propylene oxide)) flanked by two hydrophilic chains of polyoxyethylene (poly(ethylene oxide)). Because the lengths of the polymer blocks can be customized, many different poloxamers exist that have slightly different properties. Poloxamer copolymers are commonly named with the letter "P" (for poloxamer) followed by three digits, the first two digits×100 give the approximate molecular mass of the polyoxypropylene core, and the last digit×10 gives the percentage polyoxyethylene content (e.g., P407=Poloxamer with a polyoxypropylene molecular mass of 4,000 g/mol and a 70% polyoxyethylene content). For the Pluronic and Synperonic poloxamer tradenames, coding of these copolymers starts with a letter to define its physical form at room temperature (L=liquid, P=paste, F=flake (solid)) followed by two or three digits. The first digit (two digits in a three-digit number) in the numerical designation, multiplied by 300, indicates the approximate molecular weight of the hydrophobic chain; and the last digit x 10 gives the percentage polyoxyethylene content (e.g., F-68 indicates a polyoxypropylene molecular mass of 1,800 g/mol and a 80% polyoxyethylene content). An exemplary poloxamer surfactant includes, but is not limited to, Pluronic F-68. The concentration of the surfactant used can be determined empirically (i.e., titrated such that precipitation of the conjugates does not occur). In some embodiments, the concentration of surfactant is 0.02%-1%, e.g., 0.05-0.2%, e.g., 0.1%.

Prior to contacting the sample (e.g., the conjugate mixture) to the polymer filled chromatography resin, the resin can be equilibrated to establish an appropriate pH, conductivity, and/or concentration of salts.

After contacting the sample to the polymer-filled chromatography resin, the target molecule (e.g., the protein-nanoparticle conjugate) is excluded from the polymer-filled pores of the resin and is collected in the flow-through from the resin. The contaminants, e.g., free antibody (and optionally unconjugated nanoparticles) are captured by the resin groups in the pores of the beads.

The output from the resin can be monitored for the presence of the target molecule or other components of the sample, as desired, to determine fractions that contain the target molecule and that are free, or at least have a reduced amount, of contaminant compared to the original sample. In some embodiments, at least 90%, 95%, 99% of the contaminant in the sample is removed in the resulting purified target molecule fractions. An exemplary method for measuring output includes monitoring a characteristic absorbance wavelength for the target molecule. The term "fraction" is used to refer to a portion of the output of chromatography and is not intended to limit how the output is collected or whether the output is collected in parts or continuously.

EXAMPLES

Example 1—Preparation and Characterization of 3% Agarose-Filled Hydroxyapatite Microspheres (HAM)

Preparation of Agarose-Filled HAM:

A 3% agarose solution was made by dissolving 4.0 g of agarose (Hispanagar D5 High Gel Strength) in 140 mL water at 100° C. 210 grams of dry HAM (Bio-Rad Type XT) and 700 mL, hot melted agarose solution were mixed in a 700 ml flask, and then stirred for 60 minutes to form an insoluble gel inside the pores of the HAM. The heated solution was then atomized by flowing the heated solution through a 2 mm internal diameter nozzle surrounded by a stream of air at about 25° C. and at a velocity of about 20 L/minute. The resulting particles were then collected in a water bath at about 20° C.-30° C. The particles were then screened with 120 μm and 65 μm screens to remove excess agarose thin flakes. The screened agarose-filled HAM were then suspended in water to remove excess agarose. Referring to FIG. 1A (image of beads with light microscope), the resulting agarose-filled HAM comprised separate HAM with agarose in the pores and no clusters of HAM in agarose. To prove that the agarose is in the pores of the HAM, the agarose-filled HAM was treated with acetic acid buffer pH=3.5 to dissolve the hydroxyapatite and then dyed. See FIG. 1B for an image of the beads obtained by light microscope.

Characterization of Agarose-Filled HAM:

a) Thyroglobulin Static Binding Capacity Determination

The entire final resin product was re-suspended in water. Some of the slurry was transferred to a centrifuge column until the bed height of the resin reached 0.5 ml mark line of the column (a syringe was used to draw liquid from the bottom of the column, and the side of the column was tapped until the media settled). The resin was dried under vacuum for 20 seconds. 1 ml ultra-pure water was then added, mixed well with the resin, and transferred 0.3 ml slurry to a new column. The resin was washed in the new column with 5 ml 10 mM MES, pH 6.5 under vacuum. The resin was dried under vacuum for 20 seconds. The semi-dry resin was transferred to a 2-ml Eppendorf tube. 1 ml thyroglobulin sample was added to the tube. The tube was placed on a rotator mixer and rotated for 60 min. The tube was then centrifuged at 3000 rpm for 4 minutes. The UV absorbance of each of the supernatant and thyroglobulin samples was measured in a spectrophotometer at 280 nm. Static Binding Capacity (SBC) was calculated using the following equation:

SBC (mg/mL)=(Total mg protein used−mg unbound protein)/volume of resin in mL

UV absorbance was used to determine the protein concentration and the molecular weight of the protein was used to determine mg protein.

SBC results are in Table 1.

b) γ-Globulin Static Binding Capacity Determination

The entire final resin product was re-suspended in water. Some of the slurry was transferred to a centrifuge column until the bed height of the resin reached 0.5 ml mark line of the column (a syringe was used to draw liquid from the bottom of the column, and the side of the column was tapped until the media settled). The resin was dried under vacuum for 20 seconds. Then 1 ml ultra-pure water was added and mixed well with the resin, and 0.3 ml slurry was transferred to a new column. The resin was washed in the new column with 5 mL 20 mM Tris-HCl, 150 mM NaCl, pH 7.5 under vacuum. The resin was dried under vacuum for 20 seconds. The semi-dry resin was transferred to a 2-ml Eppendorf tube. A 1 ml γ-Globulin sample was added to the tube. The tube was placed on a rotary mixer and rotated for 60 minutes. The tube was centrifuged at 3000 rpm for 4 minutes. The UV absorbance of each of the supernatant and γ-Globulin samples was measured in a spectrophotometer at 280 nm. Static Binding Capacity (SBC) results are in Table 1.

TABLE 1

| Sample | Resin Volume (ml) | Thyroglobulin SBC (mg/ml) | γ-Globulin SBC (mg/ml) |
|---|---|---|---|
| HAM | 0.1 | 7.02 | 37.79 |
| Agarose-HAM | 0.1 | 1.54 | 26.36 |

Referring to Table 1, for the agarose-filled resin, the agarose blocks the protein from entering the pores of the microsphere to bind to the internal surface. As a result, the SBC decreases when compared with its corresponding control sample. The greater the protein size, the more the SBC decrease. The molecular weights for thyroglobulin and γ-globulin are 660 kDa and 150 kDa, respectively. Thus, with the agarose-filled resin, the SBC decreases more for the larger thyroglobulin than the γ-globulin. There is some decrease in SBC of γ-globulin, demonstrating that the γ-globulin of a smaller size protein can enter the pores to bind to the resin.

Example 2: Comparison of Chromatographic Properties of Agarose-Filled HAM to HAM The purpose of this example was to determine if the chromatographic properties of the HAM are changed by filling the pores of the HAM with agarose. IgG-pdot conjugate (which has a diameter of about 25 nm) was applied to each resin to determine if the conjugate bound to each resin or was excluded in the void volume. Unconjugated pdot was also applied to 3% agarose-filled HAM to determine if the agarose-filled pores allowed the unconjugated pdots to enter the pores of and to be captured by the agarose-filled HAM.

Chromatographic Property Comparison

Four disposable columns (Bio-Rad Micro Bio-Spin™ Chromatography Columns; used in gravity mode) were packed with 0.5 mL of resin as described in Table 1. The columns were equilibrated with 1-2 mL HEPES buffer pH 7.3 which had 0.1% pluronic F68 (Thermo Fisher). A 500 μL sample of purified goat anti-rabbit IgG-pdot conjugate or unconjugated pdot in HEPES buffer was applied to each column. The conjugate was prepared by modifying pdots with maleimide and then linking the pdots to the IgG through thiol groups (generated by treating the antibody with Traut's reagent). The pdots absorb at 470 nanometers and have a reddish-brown color; thus, the conjugate had a reddish-brown color.

After the samples were applied, the columns were washed with 2 mL HEPES buffer. Binding of the samples to the resins was determined visually, i.e., a red color at the top of the column or dispersed throughout the resin indicated that the sample bound to the resin. If the column remained white, then the sample did not bind to the resin (e.g., the sample is unbound). The results are summarized in Table 2.

TABLE 2

|        | Column 1 | Column 2 | Column 3 | Column 4 |
|--------|----------|----------|----------|----------|
| Resin  | 3% Agarose-filled HAM | 3% Agarose-filled HAM | HAM | HAM |
| Sample | IgG-Pdot conjugate (25 nm) | Pdot (17 nm) | IgG-Pdot conjugate (25 nm) | Pdot (17 nm) |
| Result | Unbound  | bound    | bound    | Bound    |

The results in Table 2 indicate that the IgG-pdot conjugate binds to HAM but not to the 3% agarose-filled HAM. Thus, filling the pores and coating the surface of the HAM with 3% agarose blocks the large conjugate from binding to the HAM while allowing smaller unconjugated pdots to enter the pores and to bind to the surface inside the pores of the HAM.

Example 3— Preparation and Characterization of 3% Agarose-Filled UNOsphere Q

Preparation of Agarose-UNOsphere Q

A 3% agarose solution was made by dissolving 3.0 g of agarose (Hispanagar D5 High Gel Strength) in 100 mL water at 100° C. in a 250 mL flask. 15 mL of UNOsphere (Bio-Rad UNOsphere™ Q Strong Anion Exchange Media) was mixed to the 250 ml flask, and then stirred for 60 minutes to form an insoluble gel inside the pores of the media. The heated solution was then atomized by flowing the heated solution through a 2 mm internal diameter nozzle surrounded by a stream of air at 25° C. and at a velocity of about 20 L/min. The resulting particles were then collected in a water bath at about 20° C.-30° C. The particles were then screened with a 120 μm screen to remove excess agarose thin flakes. The screened agarose-filled UNOsphere was then suspended in water to remove excess agarose. The resulting agarose-filled UNOsphere comprised separate UNOsphere beads with agarose in the pores and no clusters of UNOsphere beads in agarose (see FIG. 2 for image of agarose-filled UNOsphere beads obtained by light microscope).

Characterization of Agarose-UNOsphere Q a) Thyroglobulin Static Binding Capacity Determination The entire final resin product was re-suspended in water. Some of the slurry was transferred to a centrifuge column until the bed height of the resin reached 0.5 ml mark line of the column (a syringe was used to draw liquid from the bottom of the column, and the side of the column was tapped until the media settled). The resin was dried under vacuum for 20 seconds. Then 1 ml ultra-pure water was added and mixed well with the resin, and 0.3 ml slurry was transferred to a new column. The resin was washed in the new column with 5 ml 20 mM Bis-Tris, 50 mM NaCl, pH 7.0 under vacuum. The resin was dried under vacuum for 20 seconds. The semi-dry resin was transferred to a 2-ml Eppendorf tube and then a 1 ml thyroglobulin sample was added to the tube. The tube was placed on a rotator mixer and rotated for 30 minutes. The tube was centrifuged at 3000 rpm for 4 minutes. The UV absorbance of each of the supernatant and thyroglobulin samples was measured in a spectrophotometer at 280 nm. Static Binding Capacity (SBC) results are in Table 2.

b) γ-Globulin Static Binding Capacity Determination

The entire final resin product was re-suspended in water. Some of the slurry was transferred to a centrifuge column until the bed height of the resin reached 0.5 ml mark line of the column (a syringe was used to draw liquid from the bottom of the column, and the side of the column was tapped until the media settled). The resin was dried under vacuum for 20 seconds. Then 1 ml ultra-pure water was added and mixed well with the resin, and 0.3 ml slurry was transferred to a new column. The resin was washed in the new column with 5 mL 20 mM Tris-HCl, pH 9.5 under vacuum. The resin was dried under vacuum for 20 seconds. The semi-dry resin was transferred to a 2-ml Eppendorf tube. A 1 ml γ-Globulin sample was added to the tube. The tube was placed on a rotary mixer and rotated for 30 min. The tube was centrifuged at 3000 rpm for 4 min. The UV absorbance of each of the supernatant and γ-Globulin samples was measured in a spectrophotometer at 280 nm. SBC was calculated as described previously. SBC results are in Table 3.

TABLE 3

| Sample | Resin Volume (ml) | Thyroglobulin SBC (mg/ml) | γ-Globulins SBC (mg/ml) |
|--------|-------------------|---------------------------|-------------------------|
| UNOsphere Q | 0.1 | 7.98 | 21.14 |
| Agarose-UNOsphere Q | 0.1 | 1.44 | 20.36 |

The results for the agarose-filled UNOsphere Q in Table 3 show a greater decrease in SBC for the larger thyroglobulin than with γ-globulin. This indicates that larger protein is blocked from entering the agarose-filled pores of the resin to bind to the internal surface.

Example 4: Comparison of Chromatographic Properties of Agarose-Filled UNOsphere Q to UNOsphere Q The purpose of this example was to determine if the chromatographic properties of the UNOsphere Q are changed by filling the pores of the UNOsphere Q with agarose. IgG-pdot conjugate (which has a diameter of about 25 nm) was applied to each resin to determine if the conjugate bound to each resin or was excluded in the void volume. Unconjugated pdot was also applied to 3% agarose-filled UNOsphere Q to determine if the agarose-filled pores allowed the unconjugated pdots to enter the pores of and to be captured by the agarose-filled UNOsphere Q.

Chromatographic Property Comparison

Four disposable columns (Bio-Rad Micro Bio-Spin™ Chromatography Columns; used in gravity mode) were packed with 0.25 mL of resin as described in Table 1. The columns were equilibrated with 1-2 mL 20 mM Tris-HCl buffer pH 8.5. A 500 μL sample of purified goat anti-rabbit IgG-pdot conjugate or unconjugated pdot in 20 mM Tris-HCl buffer was applied to each column. The conjugate was prepared by modifying pdots with maleimide and then linking the pdots to the IgG through thiol groups (generated by treating the antibody with Traut's reagent). The pdots absorb at 470 nanometers and have a reddish-brown color; thus, the conjugate had a reddish-brown color.

After the samples were applied, the columns were washed with 1 mL Tris-HCl buffer. Binding of the samples to the resins was determined visually, i.e., a red color at the top of the column or dispersed throughout the resin indicated that the sample bound to the resin. If the column remained white, then the sample did not bind to the resin (e.g., the sample is unbound). The results are summarized in Table 4.

TABLE 4

|  | Column 1 | Column 2 | Column 3 | Column 4 |
|---|---|---|---|---|
| Resin | 3% Agarose-filled UNOsphere Q | 3% Agarose-filled UNOsphere Q | UNOsphere Q | UNOsphere Q |
| Sample | IgG-Pdot conjugate (25 nm) | Pdot (17 nm) | IgG-Pdot conjugate (25 nm) | Pdot (17 nm) |
| Result | unbound | unbound | Bound | bound |

The results in Table 4 indicate that both IgG-pdot conjugate and Pdot binds to UNOsphere Q but not to the 3% agarose-filled UNOsphere Q. Thus, filling the pores and coating the surface of UNOsphere Q with 3% agarose blocks both conjugate-Pdot and Pdot from binding to the UNOsphere Q.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of preparing a polymer-filled chromatography resin, the method comprising:
   adding a chromatography resin to a solution comprising melted polymer while stirring to allow the melted polymer to absorb or otherwise enter the pores of the chromatography resin;
   atomizing the solution and collecting insoluble porous polymer-filled chromatography resin beads in a water bath; and
   removing excess polymer from the insoluble porous polymer-filled chromatography resin beads.

2. The method of claim 1, wherein the removing step comprises passing the insoluble porous polymer-filled chromatography resin beads through one or more screens having openings from about 50 μm to about 200 μm.

3. The method of claim 1, further comprising washing the insoluble porous polymer-filled chromatography resin beads.

4. The method of claim 1, wherein the melted polymer is agarose and the agarose is in a concentration from about 0.5% to about 8% weight by volume.

5. The method of claim 1, wherein the chromatography resin is a macroporous resin.

6. The method of claim 5, wherein the macroporous resin is a hydroxyapatite microsphere.

7. The method of claim 5, wherein the macroporous resin comprises acrylamide, methacrylate, polystyrene, or silica.

8. The method of claim 7, wherein the macroporous resin comprises a copolymer of 3-allyloxy-1,2-propanediol and vinyl pyrrolidinone crosslinked with N,N'-methylenebisacrylamide.

9. The method of claim 7, wherein the macroporous resin comprises glycidyl methacrylate and diethylene glycol dimethacrylate.

10. The method of claim 1, wherein the melted polymer is at about 100° C.

11. The method of claim 1, wherein atomizing the solution comprises surrounding the solution emerging from a nozzle with a stream of air.

12. The method of claim 11, wherein a temperature of the stream of air is about 20° C. to about 90° C.

13. The method of claim 11, wherein a flow rate of the.

14. The method of claim 1, wherein a temperature of the water bath is about 4° C. to about 40° C.

15. A method of performing chromatography, the method comprising
   contacting a sample comprising a target molecule to an insoluble porous polymer-filled chromatography resin prepared by the process of claim 1 under conditions such that the target molecule is not captured by the insoluble porous polymer-filled chromatography resin; and
   collecting the target molecule from the insoluble porous polymer-filled chromatography resin.

16. The method of claim 15, wherein the sample comprises a contaminant that is captured by the insoluble porous polymer-filled chromatography resin.

17. The method of claim 15, wherein the target molecule is a protein-nanoparticle conjugate and the contaminant is free protein.

18. The method of claim 15, wherein the sample comprises a protein-nanoparticle conjugate, free protein, and a buffer.

19. The method of claim 18, wherein the sample further comprises a surfactant.

20. The method of claim 19, wherein the surfactant is polyalkylene glycol.

21. The method of claim 20, wherein the surfactant is Pluronic F-68.

* * * * *